United States Patent
Zhu et al.

(10) Patent No.: US 12,175,082 B2
(45) Date of Patent: Dec. 24, 2024

(54) METHOD AND APPARATUS FOR DYNAMICALLY MANAGING SHARED MEMORY POOL

(71) Applicant: HUAWEI TECHNOLOGIES CO., LTD., Guangdong (CN)

(72) Inventors: Guofeng Zhu, Shanghai (CN); Quancai Li, Hangzhou (CN); Jiansheng Tang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 139 days.

(21) Appl. No.: 17/990,990

(22) Filed: Nov. 21, 2022

(65) Prior Publication Data
US 2023/0085979 A1    Mar. 23, 2023

Related U.S. Application Data

(63) Continuation of application No. PCT/CN2020/091686, filed on May 22, 2020.

(51) Int. Cl.
    *G06F 3/06*    (2006.01)
(52) U.S. Cl.
    CPC .......... *G06F 3/0613* (2013.01); *G06F 3/0653* (2013.01); *G06F 3/067* (2013.01)
(58) Field of Classification Search
    CPC ...... G06F 3/061; G06F 3/0613; G06F 3/0631; G06F 3/0653; G06F 3/067; G06F 9/5016;
    (Continued)

(56) References Cited

U.S. PATENT DOCUMENTS 9,292,216 B1    3/2016  McGrath et al.
2012/0036309 A1*  2/2012  Dillow ............. G06F 11/108
                                                711/E12.008
(Continued)

FOREIGN PATENT DOCUMENTS

CN    101968772 A    2/2011
CN    103927264 A    7/2014
(Continued)

OTHER PUBLICATIONS

Liu Haikun et al: "Hotplug or Ballooning:A Comparative Study on Dynamic Memory Management Techniques for Virtual Machines",IEEE Transactions on Parallel and Distributed Systems,IEEE,USA,vol. 26,No. 5,May 1, 2015 (May 1, 2015),pp. 135-1363,XP011577862.
(Continued)

*Primary Examiner* — Larry T Mackall (57) ABSTRACT

A method and an apparatus for dynamically managing a shared memory pool are provided, to determine, based on different service scenarios, a shared memory pool mechanism applicable to a current service scenario, and then dynamically adjust a memory pool mechanism based on the determined result. The method for dynamically managing a shared memory pool includes: determining a first shared memory pool mechanism for the shared memory pool, where the first shared memory pool mechanism is a fixed memory pool mechanism or a dynamic memory pool mechanism; determining a second shared memory pool mechanism suitable for a second service scenario based on the second service scenario, where the second shared memory pool mechanism is a fixed memory pool mechanism or a dynamic memory pool mechanism; and when the second shared memory pool mechanism is different from the first shared memory pool mechanism, adjusting the first
(Continued)

---

S401: Determine a first shared memory pool mechanism, where the first shared memory pool mechanism is a fixed memory pool mechanism or a dynamic memory pool mechanism S402: Determine a second shared memory pool mechanism suitable for a second service scenario based on the second service scenario, where the second shared memory pool mechanism is a fixed memory pool mechanism or a dynamic memory pool mechanism S403: When the second shared memory pool mechanism is different from the first shared memory pool mechanism, adjust the first shared memory pool mechanism to the second shared memory pool mechanism shared memory pool mechanism to the second shared memory pool mechanism.

12 Claims, 6 Drawing Sheets

(58) Field of Classification Search
CPC ............ G06F 9/546; G06F 2209/5011; G06F 2209/5014; G06F 2209/503; G06F 2209/508; G06N 5/04; G06N 20/00
See application file for complete search history.

(56) References Cited

U.S. PATENT DOCUMENTS

2018/0081543 A1* 3/2018 Muchherla ............ G06F 3/0604
2019/0339892 A1 11/2019 Chang et al.

FOREIGN PATENT DOCUMENTS

| | | |
|---|---|---|
| CN | 104881324 A | 9/2015 |
| CN | 105094751 B | 1/2018 |
| CN | 107133103 B | 1/2019 |
| CN | 105247503 B | 2/2019 |
| CN | 109460302 A | 3/2019 |
| CN | 109918203 A | 6/2019 |
| KR | 101945117 B1 | 2/2019 |

OTHER PUBLICATIONS

International Search Report and Written Opinion issued in PCT/CN2020/091686, dated Feb. 22, 2021, 10 pages.
Extended European Search Report issued in EP20936608.7, dated Apr. 20, 2023, 9 pages.
Office Action issued in CN202080101088.X, dated Aug. 13, 2024, 7 pages.

* cited by examiner

S401: Determine a first shared memory pool mechanism, where the first shared memory pool mechanism is a fixed memory pool mechanism or a dynamic memory pool mechanism S402: Determine a second shared memory pool mechanism suitable for a second service scenario based on the second service scenario, where the second shared memory pool mechanism is a fixed memory pool mechanism or a dynamic memory pool mechanism S403: When the second shared memory pool mechanism is different from the first shared memory pool mechanism, adjust the first shared memory pool mechanism to the second shared memory pool mechanism

METHOD AND APPARATUS FOR DYNAMICALLY MANAGING SHARED MEMORY POOL

CROSS-REFERENCE TO RELATED APPLICATIONS

This application is a continuation of International Application No. PCT/CN2020/091686, filed on May 22, 2020, the disclosure of which is hereby incorporated by reference in its entirety.

TECHNICAL FIELD

This application relates to the storage field, and more specifically, to a method and an apparatus for dynamically managing a shared memory pool.

BACKGROUND

In recent years, with popularity of deep learning and an embedded neural network processing unit (NPU), a deep learning technology is used in increasingly more application scenarios. To adapt to various application scenarios, increasingly more unified application platforms that meet training and reasoning are introduced. For a reasoning-based application scenario such as intelligent monitoring, facial recognition, image classification, traffic alarm, and tracking, regardless of edge computing or center-side computing, a large amount of data needs to be transmitted in real time from a remote end to a chip side that has an artificial intelligence (AI) processing capability to perform a reasoning task. Transmission of the large amount of data consumes network bandwidth, and also occupies a large quantity of memory resources. For the latter problem, a memory pool sharing mechanism is currently provided in the industry, to improve data transmission efficiency and save memory resources by avoiding a large quantity of applications and releases by reusing a memory. Currently, there are two frequently-used memory pool sharing mechanisms. One is a fixed memory pool mechanism. In this manner, in a scenario in which memory usage is stable, a size of a memory pool may be pre-allocated in advance, to avoid unnecessary scaling and save a specific memory. However, this manner is not flexible enough, and cannot be applicable to a scenario, for example, a plurality of threads exist and a data stream is not fixed. The other is a dynamic memory pool mechanism. In this manner, in a scenario, for example, a plurality of threads exist and a data stream fluctuates, a memory pool is dynamically scaled, and a memory is allocated on demand, so that memory usage can be saved to a maximum degree. However, frequent scaling causes fluctuation of system performance.

SUMMARY

This application provides a method and an apparatus for dynamically managing a shared memory pool, to determine, based on different service scenarios, a shared memory pool mechanism applicable to a current service scenario, and then dynamically adjust a memory pool mechanism based on a determined result, to improve system performance.

According to a first aspect, a method for dynamically managing a shared memory pool is provided, where the method includes: determining a first shared memory pool mechanism, where the first shared memory pool mechanism is a fixed memory pool mechanism or a dynamic memory pool mechanism; determining a second shared memory pool mechanism suitable for a second service scenario based on the second service scenario, where the second shared memory pool mechanism is a fixed memory pool mechanism or a dynamic memory pool mechanism; and when the second shared memory pool mechanism is different from the first shared memory pool mechanism, adjusting the first shared memory pool mechanism to the second shared memory pool mechanism.

In the method for dynamically managing a shared memory pool in this embodiment of this application, different shared memory pool mechanisms are used in different service scenarios, a shared memory pool mechanism applicable to a current service scenario is determined based on different service scenarios, and then a memory pool mechanism is dynamically adjusted based on a determined result. This fully uses advantages of different shared memory pool mechanisms, so that the shared memory pool mechanisms better meet a service scenario requirement.

With reference to the first aspect, in a possible implementation, the first shared memory pool mechanism is a shared memory pool mechanism suitable for a first service scenario, and before the determining a second shared memory pool mechanism suitable for a second service scenario based on the second service scenario, the method further includes: determining that a service scenario has been switched from the first service scenario to the second service scenario.

The method for dynamically managing a shared memory pool in this embodiment of this application may be applicable to the following case: When the service scenario is switched, if the shared memory pool mechanism applicable to the current service scenario is also changed, a shared memory pool mechanism applicable to the current service scenario may be determined again.

With reference to the first aspect, in a possible implementation, the first shared memory pool mechanism is an initialized shared memory pool mechanism.

The method for dynamically managing a shared memory pool in this embodiment may be applicable to the following case: When a shared memory pool initialized by a system is not applicable to the current service scenario, a shared memory pool mechanism applicable to the current service scenario may be determined again.

With reference to the first aspect, in a possible implementation, the determining a second shared memory pool mechanism suitable for a second service scenario based on the second service scenario includes: determining, based on the second service scenario, a parameter that is of a second shared memory pool and that is applicable to the second service scenario; and determining the second shared memory pool mechanism applicable to the second service scenario based on the parameter of the second shared memory pool.

With reference to the first aspect, in a possible implementation, the parameter of the second shared memory pool includes a maximum value and a minimum value of a size of the second shared memory pool.

In the method for dynamically managing a shared memory pool in this embodiment, a maximum value and a minimum value of a size of a shared memory pool may be first determined, and a mechanism of the shared memory pool may be determined based on the maximum value and the minimum value of the size of the shared memory pool.

With reference to the first aspect, in a possible implementation, the determining, based on the second service scenario, a parameter that is of a second shared memory pool and that is applicable to the second service scenario includes: obtaining memory usage information in a first time period in the second service scenario; and determining the parameter of the second shared memory pool based on the memory usage information.

In the method for dynamically managing a shared memory pool in this embodiment, a parameter of a shared memory pool is determined based on actual memory usage information, so that a parameter that is of a shared memory pool and that is more applicable to the current service scenario can be obtained.

With reference to the first aspect, in a possible implementation, the determining the parameter of the second shared memory pool based on the memory usage information includes: obtaining a memory usage value in a second time period in the second service scenario; if the memory usage value is greater than a maximum value of a size of a first shared memory pool, using the memory usage value as the maximum value of the size of the second shared memory pool; or if the memory usage value is less than a maximum value of a size of a first shared memory pool, using the memory usage value as the maximum value of the size of the second shared memory pool; and if the memory usage value is greater than a minimum value of the size of the first shared memory pool, using the memory usage value as the minimum value of the size of the second shared memory pool; or if the memory usage value is less than a minimum value of the size of the first shared memory pool, using the memory usage value as the minimum value of the size of the second shared memory pool.

In the method for dynamically managing a shared memory pool in this embodiment, a method for determining a parameter of a shared memory pool based on an actual memory usage value is provided, to use the actual memory usage value as a size of the shared memory pool, so that the shared memory pool can be more suitable for the current service scenario. The method is intuitive and convenient.

With reference to the first aspect, in a possible implementation, the determining the second shared memory pool mechanism applicable to the second service scenario based on the parameter of the second shared memory pool includes: if a difference between the maximum value of the size of the second shared memory pool and the minimum value of the size of the second shared memory pool is less than a third threshold, determining that the second shared memory pool mechanism is a fixed memory pool mechanism; or if a difference between the maximum value of the size of the second shared memory pool and the minimum value of the size of the second shared memory pool is greater than a fourth threshold, determining that the second shared memory pool mechanism is a dynamic memory pool mechanism.

According to a second aspect, an apparatus for dynamically managing a shared memory pool is provided, where the apparatus includes: a determining unit, configured to determine a first shared memory pool mechanism, where the first shared memory pool mechanism is a fixed memory pool mechanism or a dynamic memory pool mechanism, where the determining unit is further configured to determine a second shared memory pool mechanism suitable for a second service scenario based on the second service scenario, where the second shared memory pool mechanism is a fixed memory pool mechanism or a dynamic memory pool mechanism; and an adjustment unit, configured to: when the second shared memory pool mechanism is different from the first shared memory pool mechanism, adjust the first shared memory pool mechanism to the second shared memory pool mechanism.

This embodiment further provides an apparatus for dynamically managing a shared memory pool, where the apparatus is configured to implement the foregoing method for dynamically managing a shared memory pool.

With reference to the second aspect, in a possible implementation, the first shared memory pool mechanism is a shared memory pool mechanism suitable for a first service scenario, and before the determining unit determines the second shared memory pool mechanism suitable for the second service scenario based on the second service scenario, the determining unit is further configured to determine that a service scenario has been switched from the first service scenario to the second service scenario.

With reference to the second aspect, in a possible implementation, the first shared memory pool mechanism is an initialized shared memory pool mechanism.

With reference to the second aspect, in a possible implementation, that the determining unit determines a second shared memory pool mechanism suitable for a second service scenario based on the second service scenario includes: determining, based on the second service scenario, a parameter that is of a second shared memory pool and that is applicable to the second service scenario; and determining the second shared memory pool mechanism applicable to the second service scenario based on the parameter of the second shared memory pool.

With reference to the second aspect, in a possible implementation, the parameter of the second shared memory pool includes a maximum value and a minimum value of a size of the second shared memory pool.

With reference to the second aspect, in a possible implementation, that the determining unit determines, based on the second service scenario, a parameter that is of a second shared memory pool and that is applicable to the second service scenario includes: obtaining memory usage information in a first time period in the second service scenario; and determining the parameter of the second shared memory pool based on the memory usage information.

With reference to the second aspect, in a possible implementation, that the determining unit determines the parameter of the second shared memory pool based on the memory usage information includes: obtaining a memory usage value in a second time period in the second service scenario;

if the memory usage value is greater than a maximum value of a size of a first shared memory pool, using the memory usage value as the maximum value of the size of the second shared memory pool; or if the memory usage value is less than a maximum value of a size of a first shared memory pool, using the memory usage value as the maximum value of the size of the second shared memory pool; and if the memory usage value is greater than a minimum value of the size of the first shared memory pool, using the memory usage value as the minimum value of the size of the second shared memory pool; or if the memory usage value is less than a minimum value of the size of the first shared memory pool, using the memory usage value as the minimum value of the size of the second shared memory pool.

With reference to the second aspect, in a possible implementation, that the determining unit determines the second shared memory pool mechanism applicable to the second service scenario based on the parameter of the second shared memory pool includes: if a difference between the maximum value of the size of the second shared memory pool and the minimum value of the size of the second shared memory pool is less than a third threshold, determining that the second shared memory pool mechanism is a fixed memory pool mechanism; or if a difference between the maximum value of the size of the second shared memory pool and the minimum value of the size of the second shared memory pool is greater than a fourth threshold, determining that the second shared memory pool mechanism is a dynamic memory pool mechanism.

According to a third aspect, a computer program storage medium is provided, where the computer program storage medium has program instructions, and when the program instructions are executed by a processor, the processor is enabled to perform the method in any one of the first aspect or the implementations of the first aspect.

According to a fourth aspect, a chip is provided, where the chip includes at least one processor, and when program instructions are executed by the at least one processor, the at least one processor is enabled to perform the method in any one of the first aspect or the implementations of the first aspect.

According to a fifth aspect, a terminal device is provided, including the foregoing apparatus for dynamically managing a shared memory pool.

DESCRIPTION OF EMBODIMENTS

The following describes technical solutions of this application with reference to the accompanying drawings.

Figure 1:
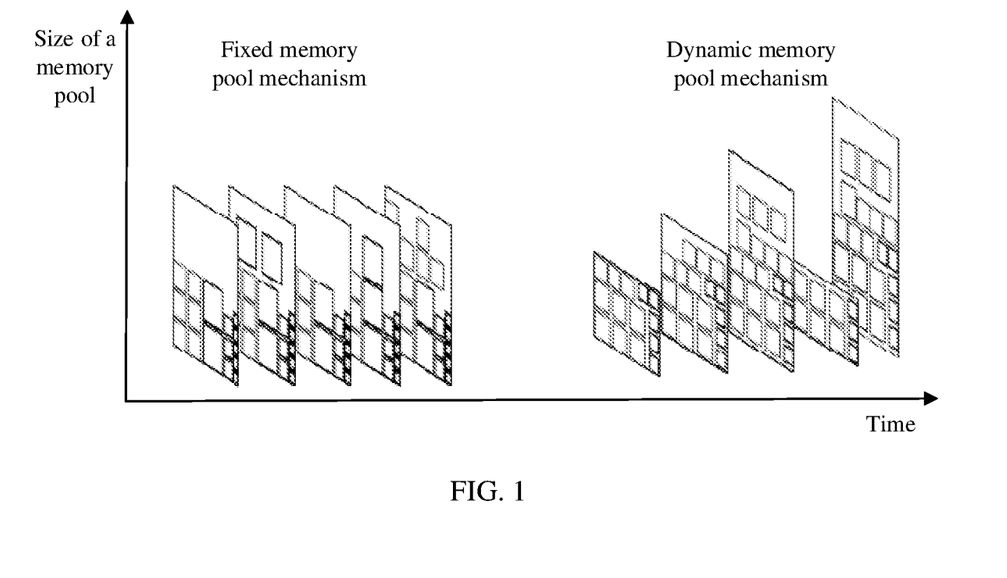
FIG. 1 is a schematic block diagram of two existing memory pool sharing mechanisms according to an embodiment of this application.

Sharing a memory pool is to apply for a memory with a proper size in advance, and use the memory as a memory pool for access by a plurality of processes. The plurality of processes may be different processes of a same device, or may be different processes of different devices. FIG. 1 shows two existing memory pool sharing mechanisms, including a fixed memory pool mechanism and a dynamic memory pool mechanism. The fixed memory pool mechanism means that a size of a pre-allocated memory pool has been determined and is fixed. The memory pool is not dynamically scaled based on a service change. For the mechanism, in a scenario in which memory usage is stable, the size of the memory pool may be pre-allocated in advance, to avoid unnecessary scaling and save a specific memory. However, the mechanism is not flexible enough, and cannot be applicable to a scenario, for example, a plurality of threads exist and a data stream is not fixed. When a plurality of threads exist, a size of a required memory pool cannot be determined in advance. Consequently, the fixed memory pool is rapidly depleted, and a subsequent memory application is blocked. Even if there is a physical memory, for a user service, no memory can be applied for. Consequently, service performance is bottlenecked. The dynamic memory pool mechanism means that a size of a memory pool can be changed on demand. In this mechanism, the size of the memory pool is a dynamic range [Min, Max]. In a scenario, for example, a plurality of threads exist and a data stream fluctuates, the memory pool is dynamically scaled, and a memory is allocated on demand, so that memory usage can be saved to a maximum degree. However, performance fluctuates during memory scaling. In a complex service scenario such as a multi-process/multi-thread service scenario, frequent scaling is required. Consequently, system performance fluctuates.

Figure 2:
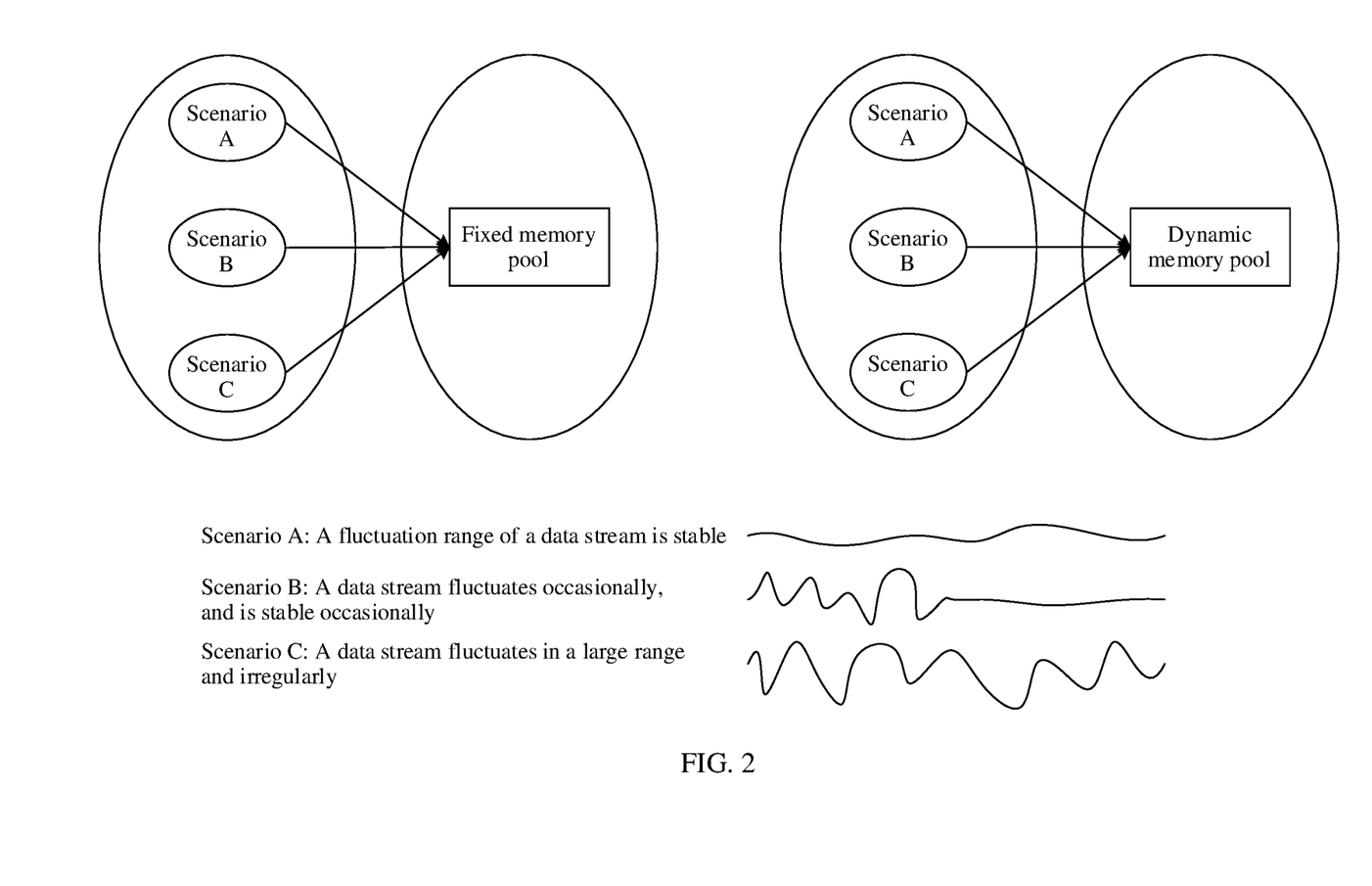
FIG. 2 is a schematic block diagram of a possible application scenario of a method for dynamically managing a shared memory pool according to an embodiment of this application.

There are various application scenarios of a memory pool mechanism. FIG. 2 shows three possible application scenarios, including:

a scenario A: a single video stream exists, and data input is stable;

a scenario B: a single video stream exists, data stream input fluctuates during the day and is stable at night, and memory consumption is regular; and a scenario C: a plurality of video streams exist, data input dynamically changes, and memory consumption fluctuates.

In a conventional technology, a memory mechanism is generally determined to be applicable to all scenarios. To be specific, the fixed memory pool is used in the scenarios A, B, and C, or the dynamic memory pool is used in the scenarios A, B, and C. Actually, the fixed memory pool mechanism is suitable for the scenario A, and the dynamic memory pool mechanism is suitable for the scenario C. In the scenario B, the dynamic memory pool is suitable for the daytime, and the fixed memory pool is suitable for the night. In addition, regardless of the dynamic memory pool or the fixed memory pool, a key memory pool configuration parameter such as a memory size and a memory range is manually preset based on experience, and the memory pool cannot be actually applicable to different scenarios and different requirements. For an open application scenario, especially a basic computing platform, a plurality of different service scenarios necessarily exist. Currently, there is no solution in which dynamic adaptation can be performed for the application scenario. Predetermined memory pool mechanisms have respective advantages and disadvantages, and cannot be applicable to all user service scenarios. In a method for dynamically managing a shared memory pool in embodiments of this application, an adaptation relationship between each scenario and a memory pool mechanism may be dynamically learned through pre-learning, and then the memory pool mechanism is dynamically adjusted based on a learning result, so that the fixed memory pool is used in the scenario A, the dynamic memory pool is used in the scenario C, and switching is dynamically performed between the fixed memory pool and the dynamic memory pool in the scenario B based on a service scenario, so that service performance is optimal.

In embodiments of this application, an optimal matching relationship between different application scenarios and memory pool mechanisms is found, and the memory pool mechanism is dynamically adjusted based on the application scenario, to fully use an advantage of each memory pool mechanism, and avoid a disadvantage thereof. An advantage such as rapidness, high efficiency, and stability of the fixed memory pool and an advantage such as flexibility, saving memory usage and on-demand allocation of the dynamic memory pool are fully used, so that a problem that a single memory pool mechanism cannot dynamically adapt to different scenarios is resolved.

It should be understood that the service scenarios A, B, and C are merely examples of the service scenario, and do not constitute a limitation on embodiments of this application. In addition to the service scenario in FIG. 2, the method for dynamically managing a shared memory pool in embodiments of this application may be applied to another service scenario.

Figure 3:
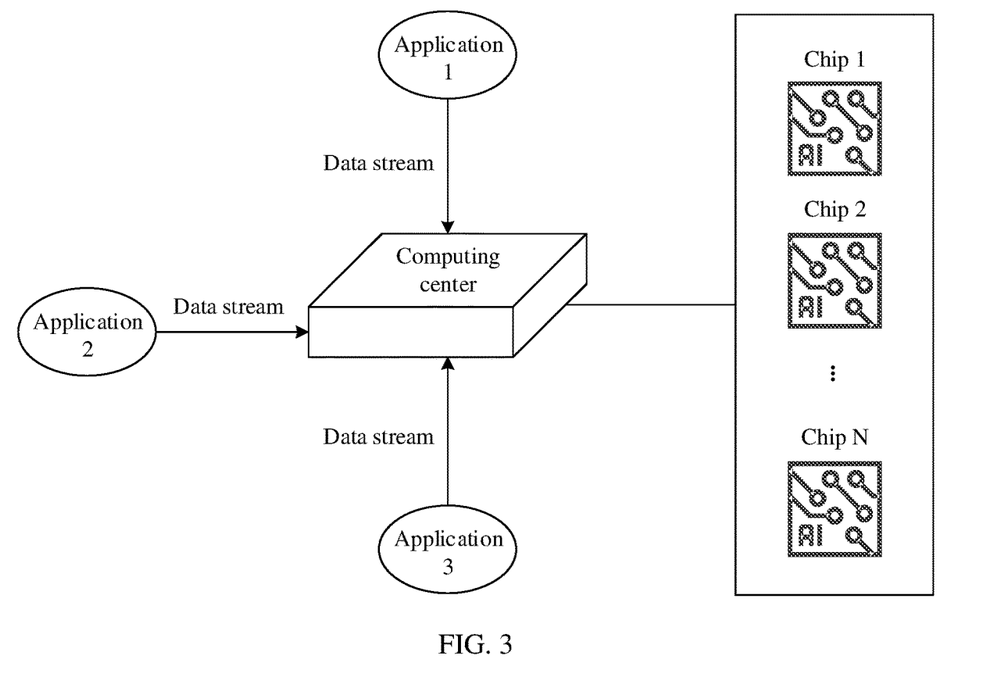
FIG. 3 shows an application scenario of a method for dynamically managing a shared memory pool according to an embodiment of this application.

FIG. 3 shows an application scenario of a method for dynamically managing a shared memory pool according to an embodiment of this application. Currently, in a widely used application scenario such as intelligent security protection and a safe city, a large quantity of videos or pictures need to be transmitted by using an intelligent camera to a computing center for reasoning processing. Specific tasks include recognition (a motor vehicle, a non-motor vehicle, a face, and the like), picture classification, retrieval, and tracking (a vehicle, a pedestrian, and the like). Most of the foregoing tasks depend on a processing capability of an AI chip. As the processing capability of the AI chip continuously improves, various types of AI NPUs in the market have different AI computing capabilities. To fully exert processing capabilities of different chips, a single chip simultaneously processes a plurality of reasoning tasks, for example, a plurality of videos simultaneously access the chip, or a plurality of chips cooperatively process a single reasoning task, for example, CPU-intensive retrieval. In the method for dynamically managing a shared memory pool in this embodiment, when various service applications transmit data streams, a user does not need to analyze service stream behavior in advance, and a system may dynamically adapt to memory requirements in different scenarios, so that system performance is optimal.

Figure 4:
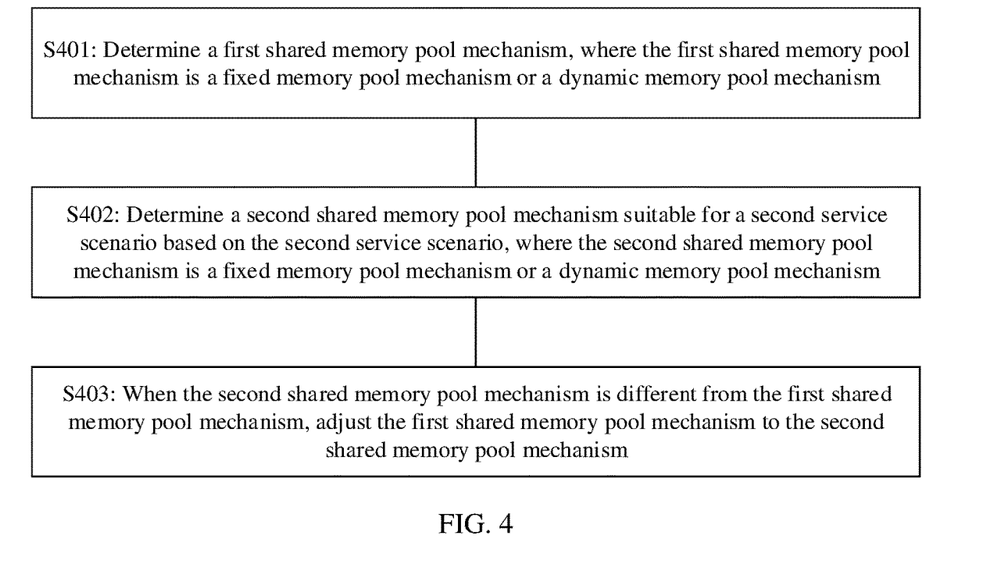
FIG. 4 is a schematic flowchart of a method for dynamically managing a shared memory pool according to an embodiment of this application.

FIG. 4 is a schematic flowchart of a method for dynamically managing a shared memory pool according to an embodiment of this application. As shown in FIG. 4, step 401 to step 403 are included, and the following describes these steps in detail.

S401. Determine a first shared memory pool mechanism, where the first shared memory pool mechanism is a fixed memory pool mechanism or a dynamic memory pool mechanism.

Optionally, the first shared memory pool mechanism is an initialized shared memory pool mechanism. To be specific, the first shared memory pool mechanism may be a preset fixed memory pool mechanism or dynamic memory pool mechanism, or may be a shared memory pool mechanism randomly initialized by a system. After a shared memory pool mechanism suitable for a current service scenario is determined based on a service scenario, the shared memory pool mechanism is adjusted.

Optionally, the first shared memory pool mechanism is a shared memory pool mechanism suitable for a first service scenario, and before the determining a second shared memory pool mechanism suitable for a second service scenario based on the second service scenario, the method further includes: determining that a service scenario has been switched from the first service scenario to the second service scenario. Specifically, the service scenario may be the service scenario A, the service scenario B, and the service scenario C that are listed in FIG. 2 as an example, or may be another service scenario.

S402. Determine a second shared memory pool mechanism suitable for a second service scenario based on the second service scenario, where the second shared memory pool mechanism is a fixed memory pool mechanism or a dynamic memory pool mechanism.

Specifically, a parameter that is of a second shared memory pool and that is applicable to the second service scenario is first determined based on the second service scenario, and then the second shared memory pool mechanism applicable to the second service scenario is determined based on the parameter of the second shared memory pool.

A parameter of a shared memory pool includes a maximum value and a minimum value of a size of the shared memory pool. When the shared memory pool is a fixed memory pool, a difference between the maximum value and the minimum value of the size of the shared memory pool is less than a third threshold. The third threshold may be a manually specified value.

In the method for dynamically managing a shared memory pool in this embodiment, when the parameter that is of the second shared memory pool and that is applicable to the second service scenario is determined based on the second service scenario, memory usage information in a first time period in the second service scenario may be first obtained, and then the parameter of the second shared memory pool is determined based on the memory usage information. For example, the memory usage information may be a memory usage value. If the memory usage value is greater than a maximum value of a size of a first shared memory pool, the memory usage value is used as a maximum value of a size of the second shared memory pool; or if the memory usage value is less than a maximum value of a size of a first shared memory pool, the memory usage value is used as a maximum value of a size of the second shared memory pool. If the memory usage value is greater than a minimum value of the size of the first shared memory pool, the memory usage value is used as a minimum value of the size of the second shared memory pool; or if the memory usage value is less than a minimum value of the size of the first shared memory pool, the memory usage value is used as a minimum value of the size of the second shared memory pool. For another example, the memory usage information may be a memory usage ratio (a ratio of a memory usage value to a total size of a memory pool). If the memory usage ratio is greater than a first threshold, a maximum value of a size of a first shared memory pool of the first shared memory pool mechanism is multiplied by a first coefficient, to use an obtained value as a maximum value of a size of the second shared memory pool. The first coefficient is greater than 1. Alternatively, a minimum value of a size of a first shared memory pool is multiplied by a second coefficient, to use an obtained value as a minimum value of a size of the second shared memory pool. The second coefficient is less than 1. If the memory usage ratio is less than a second threshold, a maximum value of a size of a first shared memory pool is multiplied by a third coefficient, to use an obtained value as a maximum value of a size of the second shared memory pool. The third coefficient is less than 1. Alternatively, a minimum value of a size of a first shared memory pool is multiplied by a fourth coefficient, to use an obtained value as a minimum value of a size of the second shared memory pool. The first coefficient is greater than 1.

It should be understood that, in addition to the memory usage value and the memory usage ratio, the memory usage information in the service scenario may further include memory usage information such as a quantity of memory blocks that need to be added to a current memory pool and a quantity of memory blocks that need to be reduced in the current memory pool.

It should be understood that the method for determining, based on the second service scenario, the parameter that is of the second shared memory pool and that is applicable to the second service scenario is only an example of the method for dynamically managing a shared memory pool in this embodiment. In addition to the foregoing method, in this embodiment, a learning rule set may be further used to determine the parameter that is of the second shared memory pool and that is applicable to the second service scenario. The learning rule set may be a priori rule formed by "IF A THEN B".

In the method for dynamically managing a shared memory pool in this embodiment, the determining the second shared memory pool mechanism applicable to the second service scenario based on the parameter of the second shared memory pool may be determined by using the following method: If a difference between the maximum value of the size of the second shared memory pool and the minimum value of the size of the second shared memory pool is less than a third threshold, it is determined that the second shared memory pool mechanism is a fixed memory pool mechanism; or if a difference between the maximum value of the size of the second shared memory pool and the minimum value of the size of the second shared memory pool is greater than a fourth threshold, it is determined that the second shared memory pool mechanism is a dynamic memory pool mechanism. The fourth threshold may be a manually specified value.

S403. When the second shared memory pool mechanism is different from the first shared memory pool mechanism, adjust the first shared memory pool mechanism to the second shared memory pool mechanism.

It should be understood that, if the second shared memory pool mechanism is the same as the first shared memory pool mechanism, no adjustment is performed.

It should be understood that the method for dynamically managing a shared memory pool in this embodiment is a dynamic cyclic method. After a shared memory pool mechanism applicable to a current service scenario is determined based on a service scenario, the method in this embodiment further includes: monitoring a change of the service scenario in real time. For example, a parameter that is of the shared memory pool mechanism and that is applicable to the current service scenario may be adjusted based on real-time memory usage information (for example, a memory usage value or a memory usage ratio), so that a size or a size range of the shared memory pool is more suitable for the current service scenario. If the service scenario is switched to enable the current shared memory pool mechanism to be no longer suitable for the current service scenario, a shared memory pool mechanism applicable to the current service scenario may be determined again based on a service scenario obtained through switching.

It should be understood that, in the method for dynamically managing a shared memory pool in this embodiment, based on different service scenarios, the shared memory pool mechanism applicable to the current service scenario may be dynamically switched and the parameter that is of the shared memory pool and that is applicable to the current service scenario may be dynamically adjusted. However, because there are actually various service scenarios that cannot be exhaustive, the method for dynamically managing a shared memory pool in this embodiment is not necessarily related to an actual service scenario. Instead, based on memory usage information in the actual service scenario, the shared memory pool mechanism applicable to the current service scenario is dynamically switched and the parameter that is of the shared memory pool mechanism and that is applicable to the current service scenario is dynamically adjusted.

Figure 5:
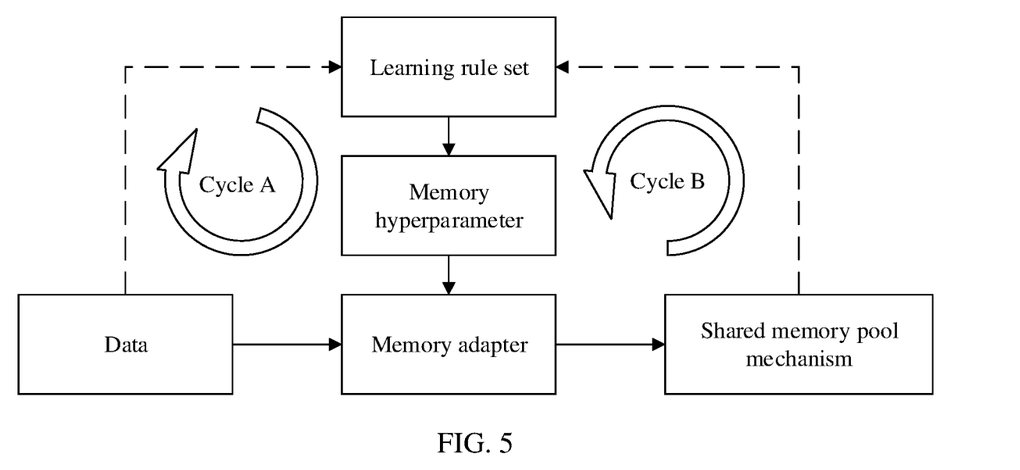
FIG. 5 is a schematic block diagram of a specific implementation of a method for dynamically managing a shared memory pool according to an embodiment of this application.

FIG. 5 is a schematic block diagram of a specific implementation of a method for dynamically managing a shared memory pool according to an embodiment of this application. As shown in FIG. 5, a learning rule set, a memory hyperparameter (memory hyper-parameter), a memory adapter, and a shared memory pool mechanism are mainly included.

Based on a data stream and the learning rule set, two dynamic feedback cycles are formed: a cycle A and a cycle B. In the cycle A, a memory hyperparameter in a first stage is determined based on input data and the learning rule set, and then a memory shared memory mechanism that best matches a current service scenario is determined based on the memory hyperparameter. In the cycle B, the memory hyperparameter is adjusted based on the learning rule set. When the service scenario is switched, the current shared memory pool mechanism may not be applicable to the current service scenario. In this case, a shared memory pool mechanism that best matches the current service scenario is determined based on the adjusted memory hyperparameter.

The learning rule set mainly includes a group of priori rules formed by "IF A THEN B". The priori rules are as follows:
1. If UsedBlocks>Min && Duration>TimeThreshold && RepeatedTimes>TimesThreshold, Then Min=min (UsedBlocks);
2. If MemUsageRate>95% && Duration>TimeThreshold && RepeatedTimes>TimesThreshold, Then Max=Max*(1+10%);
3. If EnlargeCount<enThreshold && ReduceCount<reThreshold, Then IsFixed=true;
4. If Max−Min<LowThreshold && IsFixed==false, Then IsFixed=true;
5. If Max−Min>HighThreshold && IsFixed==true, Then IsFixed=false;
6. If Max−Min<LowThreshold, Then FixedMemSize=Max.
1. UsedBlocks is a quantity of used memory blocks. Duration>TimeThreshold means that a used memory block continuously exceeds a time threshold. RepeatedTimes>TimesThreshold means that a quantity of times the case occurs is greater than a quantity-of-times threshold. Min=min (UsedBlocks) may be defined in another manner. For example, a value of Min may be set to a smaller value that most frequently occurs in quantities of used memory blocks. This is merely an example herein. This is not specifically limited in this embodiment of this application.
2. MemUsageRate is a current memory usage ratio, namely, a ratio of a size of a used memory block to a total size of a memory pool. Max=Max*(1+10%) may be defined in another manner, for example, may be another percentage, or a value obtained by adding a current value of Max and a specific value, for example, 200 M. This is merely an example. This is not specifically limited in this embodiment of this application.

3. EnlargeCount<enThreshold means that a quantity of memory blocks that need to be added is less than an upper limit of a quantity of memory blocks that a system allows to add. ReduceCount<reThreshold means that a quantity of memory blocks that need to be reduced is less than an upper limit of a quantity of memory blocks that the system allows to reduce.
4. Max−Min<LowThreshold means that an interval between a maximum value and a minimum value of a range of a dynamic memory pool exceeds a specified minimum threshold.
5. Max−Min>HighThreshold means that an interval between a maximum value and a minimum value of a range of a dynamic memory pool exceeds a specified maximum threshold.

The memory hyperparameter includes: a parameter FixedMemSize of a fixed memory pool mechanism, to indicate a size of a memory pool, a parameter Min of a dynamic memory pool mechanism, to indicate a minimum value of a size of a memory pool, a parameter Max of the dynamic memory pool mechanism, to indicate a maximum value of the size of the memory pool, and a memory pool mechanism selection button IsFixed, to indicate whether to switch the memory pool.

The memory adapter determines, based on a value of IsFixed, to switch between the dynamic memory pool mechanism and the fixed memory pool mechanism. In addition, in a switching process, configuration of a current shared memory pool mechanism, namely, the size of the memory pool or the size range of the memory pool, is set based on the learned memory hyperparameter.

The shared memory pool mechanism in this embodiment mainly includes the fixed memory pool mechanism and the dynamic memory pool mechanism. A size of a memory pool of the fixed memory pool mechanism is fixed, and is not adjusted based on a service change, and all memory application operations are completed in the memory pool. A size of a memory pool of the dynamic memory pool mechanism is dynamically adjusted based on a service requirement. An adjustment range thereof is generally a fixed range interval [Min, Max].

The method for dynamically managing a shared memory pool in this embodiment may be applied to a scenario such as a reasoning computing platform, and deployed on a computing node of a related device. Infrastructure platform software is reconstructed, so that different shared memory pool mechanisms can dynamically adapt to different service scenarios, to use an advantage of each shared memory pool mechanism to a maximum degree. Specifically, when the shared memory pool mechanism is a dynamic memory pool mechanism, if a quantity of memory blocks used in a memory pool remains high for a long time period, a minimum value Min of a size of the memory pool may be dynamically adjusted; if a memory pool usage ratio is higher than a threshold (95%) for a long time period, a maximum value Max of a size of the memory pool may be dynamically adjusted; or if a minimum value Min of a size of the memory pool is approximately equal to a maximum value Max of the size of the memory pool, a dynamic memory pool may be adjusted to a fixed memory pool.

It should be understood that the example in FIG. 5 is merely an example of the method for dynamically managing a shared memory pool in this embodiment, and does not constitute a limitation on the method for dynamically managing a shared memory pool in this embodiment. The foregoing learning rule set may be another rule, or a definition in the foregoing priori rule may be another definition manner, or the foregoing nonproprietary name may be replaced with another noun having a same meaning. Based on the same concept, a person skilled in the art may make equivalent changes in the foregoing example to achieve a same or similar effect. In a method for dynamically managing a shared memory pool obtained based on the equivalent changes, a technical effect of the method for dynamically managing a shared memory pool in this embodiment can still be achieved. Therefore, these equivalent changes shall fall within the protection scope of this application.

Figure 6:
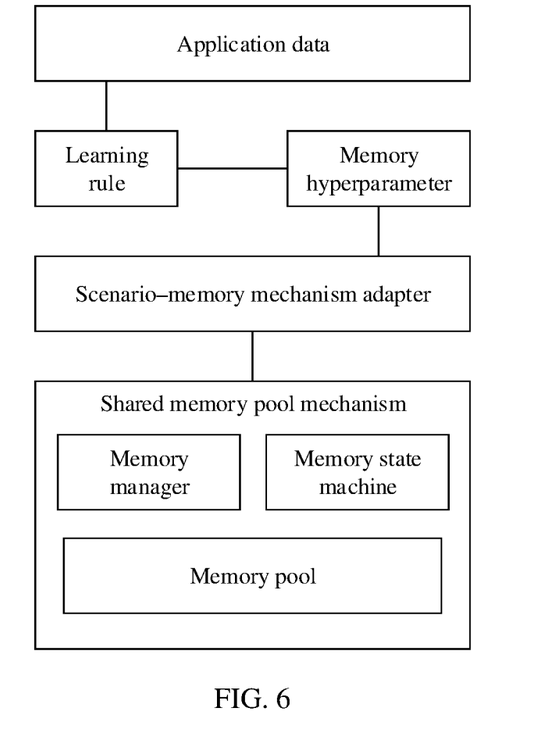
FIG. 6 is a schematic architecture diagram of a system according to an embodiment of this application.

FIG. 6 is a schematic architecture diagram of a system according to an embodiment of this application. As shown in FIG. 6, the system first obtains data, of a related application, that specifically includes memory usage information in a current service scenario. Then, the system may obtain a memory hyperparameter based on a learning rule, where the learning rule is a rule set that is preset during system initialization, and is used to indicate the system how to learn. The memory hyperparameter is used to determine a shared memory pool mechanism and a memory size or a memory size range of a shared memory pool. A scenario-memory mechanism adapter is used to perform switching between a dynamic memory pool mechanism and a fixed memory pool mechanism based on the memory hyperparameter. After a shared memory pool mechanism applicable to the current service scenario is determined, the data of the related application is stored for subsequent processing.

Figure 7:
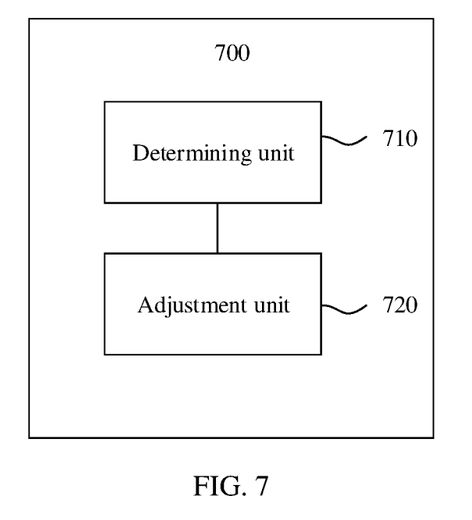
FIG. 7 is a schematic diagram of a structure of an apparatus for dynamically managing a shared memory pool according to an embodiment of this application.

FIG. 7 is a schematic diagram of a structure of a memory management apparatus 700 for dynamically managing a shared memory pool according to an embodiment of this application. The memory management apparatus 700 includes a determining unit 710 and an adjustment unit 720.

The determining unit 710 is configured to determine a first shared memory pool mechanism, where the first shared memory pool mechanism is a fixed memory pool mechanism or a dynamic memory pool mechanism.

The determining unit 710 is further configured to determine a second shared memory pool mechanism suitable for a second service scenario based on the second service scenario, where the second shared memory pool mechanism is a fixed memory pool mechanism or a dynamic memory pool mechanism.

The adjustment unit 720 is configured to: when the second shared memory pool mechanism is different from the first shared memory pool mechanism, adjust the first shared memory pool mechanism to the second shared memory pool mechanism.

Optionally, the first shared memory pool mechanism is a shared memory pool mechanism suitable for a first service scenario.

Before the determining unit 710 determines the second shared memory pool mechanism suitable for the second service scenario based on the second service scenario, the determining unit 710 is further configured to determine that a service scenario has been switched from the first service scenario to the second service scenario.

Optionally, the first shared memory pool mechanism is an initialized shared memory pool mechanism.

Optionally, that the determining unit 710 determines a second shared memory pool mechanism suitable for a second service scenario based on the second service scenario includes: determining, based on the second service scenario, a parameter that is of a second shared memory pool and that is applicable to the second service scenario; and determining the second shared memory pool mechanism applicable to the second service scenario based on the parameter of the second shared memory pool.

Optionally, the parameter of the second shared memory pool includes a maximum value and a minimum value of a size of the second shared memory pool.

Optionally, that the determining unit 710 determines, based on the second service scenario, a parameter that is of a second shared memory pool and that is applicable to the second service scenario includes: obtaining memory usage information in a first time period in the second service scenario; and determining the parameter of the second shared memory pool based on the memory usage information.

Optionally, that the determining unit 710 determines the parameter of the second shared memory pool based on the memory usage information includes:

obtaining a memory usage value in a second time period in the second service scenario; if the memory usage value is greater than a maximum value of a size of a first shared memory pool, using the memory usage value as the maximum value of the size of the second shared memory pool; or if the memory usage value is less than a maximum value of a size of a first shared memory pool, using the memory usage value as the maximum value of the size of the second shared memory pool; and if the memory usage value is greater than a minimum value of the size of the first shared memory pool, using the memory usage value as the minimum value of the size of the second shared memory pool; or if the memory usage value is less than a minimum value of the size of the first shared memory pool, using the memory usage value as the minimum value of the size of the second shared memory pool.

Optionally, that the determining unit 710 determines the second shared memory pool mechanism applicable to the second service scenario based on the parameter of the second shared memory pool includes: if a difference between the maximum value of the size of the second shared memory pool and the minimum value of the size of the second shared memory pool is less than a third threshold, determining that the second shared memory pool mechanism is a fixed memory pool mechanism; or if a difference between the maximum value of the size of the second shared memory pool and the minimum value of the size of the second shared memory pool is greater than a fourth threshold, determining that the second shared memory pool mechanism is a dynamic memory pool mechanism.

It should be understood that the determining unit 710 in FIG. 7 may be configured to perform the methods in S401 and S402 in FIG. 4, and the adjustment unit 720 may be configured to perform the method in S403 in FIG. 4. For details, refer to the foregoing description in FIG. 4. For brevity, details are not described again in this embodiment.

Figure 8:
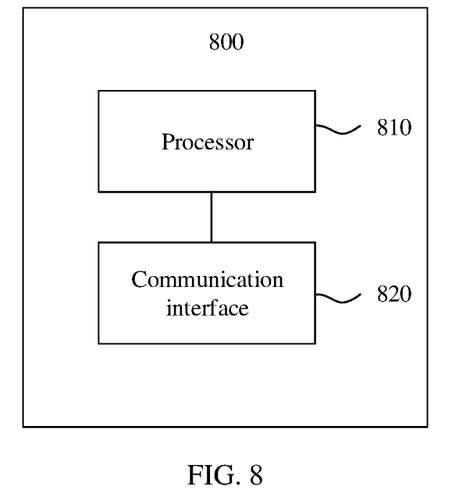
FIG. 8 is a schematic diagram of a structure of another apparatus for dynamically managing a shared memory pool according to an embodiment of this application.

FIG. 8 is a schematic diagram of a structure of a memory management apparatus 800 for dynamically managing a shared memory pool according to an embodiment of this application. The memory management apparatus 800 may include at least one processor 810 and a communication interface 820. The communication interface 820 may be configured to exchange information by the memory management apparatus 800 with another apparatus. When program instructions are executed by the at least one processor 810, the memory management apparatus 800 is enabled to implement steps, methods, operations, or functions performed by the foregoing apparatus for dynamically managing a shared memory pool.

Figure 9:
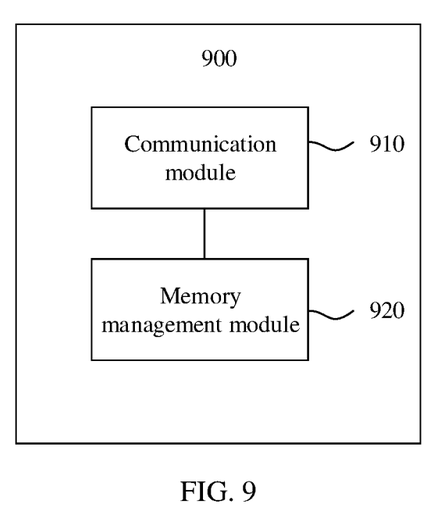
FIG. 9 is a schematic diagram of a structure of still another apparatus for dynamically managing a shared memory pool according to an embodiment of this application.

FIG. 9 is a schematic diagram of a structure of an apparatus for dynamically managing a shared memory pool according to an embodiment of this application. The apparatus 900 for dynamically managing a shared memory pool includes a communication module 910 and a memory management module 920.

The communication module 910 is configured to exchange information with another module.

The memory management module 920 is configured to determine a first shared memory pool mechanism, where the first shared memory pool mechanism is a fixed memory pool mechanism or a dynamic memory pool mechanism.

The memory management module 920 is further configured to determine a second shared memory pool mechanism suitable for a second service scenario based on the second service scenario, where the second shared memory pool mechanism is a fixed memory pool mechanism or a dynamic memory pool mechanism.

The memory management module 920 is further configured to: when the second shared memory pool mechanism is different from the first shared memory pool mechanism, adjust the first shared memory pool mechanism to the second shared memory pool mechanism.

Optionally, the first shared memory pool mechanism is a shared memory pool mechanism suitable for a first service scenario.

Before the memory management module 920 determines the second shared memory pool mechanism suitable for the second service scenario based on the second service scenario, the memory management module 920 is further configured to determine that a service scenario has been switched from the first service scenario to the second service scenario.

Optionally, the first shared memory pool mechanism is an initialized shared memory pool mechanism.

Optionally, that the memory management module 920 determines a second shared memory pool mechanism suitable for a second service scenario based on the second service scenario includes: determining, based on the second service scenario, a parameter that is of a second shared memory pool and that is applicable to the second service scenario; and determining the second shared memory pool mechanism applicable to the second service scenario based on the parameter of the second shared memory pool.

Optionally, the parameter of the second shared memory pool includes a maximum value and a minimum value of a size of the second shared memory pool.

Optionally, that the memory management module 920 determines, based on the second service scenario, a parameter that is of a second shared memory pool and that is applicable to the second service scenario includes: obtaining memory usage information in a first time period in the second service scenario; and determining the parameter of the second shared memory pool based on the memory usage information.

Optionally, that the memory management module 920 determines the parameter of the second shared memory pool based on the memory usage information includes:

obtaining a memory usage value in a second time period in the second service scenario; if the memory usage value is greater than a maximum value of a size of a first shared memory pool, using the memory usage value as the maximum value of the size of the second shared memory pool; or if the memory usage value is less than a maximum value of a size of a first shared memory pool, using the memory usage value as the maximum value of the size of the second shared memory pool; and if the memory usage value is greater than a minimum value of the size of the first shared memory pool, using the memory usage value as the minimum value of the size of the second shared memory pool; or if the memory usage value is less than a minimum value of the size of the first shared memory pool, using the memory usage value as the minimum value of the size of the second shared memory pool.

Optionally, that the memory management module 920 determines the second shared memory pool mechanism applicable to the second service scenario based on the parameter of the second shared memory pool includes: if a difference between the maximum value of the size of the second shared memory pool and the minimum value of the size of the second shared memory pool is less than a third threshold, determining that the second shared memory pool mechanism is a fixed memory pool mechanism; or if a difference between the maximum value of the size of the second shared memory pool and the minimum value of the size of the second shared memory pool is greater than a fourth threshold, determining that the second shared memory pool mechanism is a dynamic memory pool mechanism.

It should be understood that the memory management module 920 in FIG. 9 may be configured to perform the methods in S401 to S403 in FIG. 4. For details, refer to the foregoing description in FIG. 4. For brevity, details are not described again in this embodiment.

An embodiment of this application further provides a terminal device, including the foregoing apparatus for dynamically managing a shared memory pool.

An embodiment of this application further provides a computer program storage medium, where the computer program storage medium has program instructions, and when the program instructions are executed by a processor, the processor is enabled to perform the foregoing method for dynamically managing a shared memory pool.

An embodiment of this application further provides a chip system, where the chip system includes at least one processor, and when program instructions are executed by the at least one processor, the at least one processor is enabled to perform the foregoing method for dynamically managing a shared memory pool.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

In this application, "at least one" means one or more, and "a plurality of" means two or more. The term "and/or" describes an association relationship for describing associated objects and represents that three relationships may exist. For example, A and/or B may represent any one of the following three cases: Only A exists, both A and B exist, or only B exists. A and B may be in a singular or plural form. The character "/" usually indicates an "or" relationship between associated objects. "At least one of the following items" or a similar expression thereof indicates any combination of these items, including a single item or any combination of a plurality of items. For example, at least one item of a, b, and c may indicate: a, b, c, a and b, a and c, b and c, or a, b, and c, where a, b, and c may be singular or plural. It may be clearly understood by a person skilled in the art that, for the purpose of convenient and brief description, for a detailed working process of the foregoing system, apparatus, and unit, refer to a corresponding process in the foregoing method embodiments. Details are not described herein again.

In several embodiments provided in this application, it should be understood that the disclosed system, apparatus, and method may be implemented in other manners. For example, the foregoing apparatus embodiments are merely examples. For example, division into the units is merely logical function division. In an actual implementation, there may be another division manner. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

When functions are implemented in the form of a software functional unit and sold or used as an independent product, the functions may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing description is a merely specific implementation of this application, but is not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for dynamically managing a shared memory pool, comprising:
   determining a first shared memory pool mechanism for the shared memory pool, wherein the first shared memory pool mechanism is a fixed memory pool mechanism or a dynamic memory pool mechanism;
   determining a second shared memory pool mechanism suitable for a second service scenario based on the second service scenario, wherein the second shared memory pool mechanism is a fixed memory pool mechanism or a dynamic memory pool mechanism; and when the second shared memory pool mechanism is different from the first shared memory pool mechanism, adjusting the first shared memory pool mechanism to the second shared memory pool mechanism, wherein the determining a second shared memory pool mechanism suitable for a second service scenario based on the second service scenario comprises:

determining, based on the second service scenario, meter of a second shared memory pool the parameter being applicable to the second service scenario, and determining the second shared memory pool mechanism applicable to the second service scenario based on the parameter of the second shared memory pool, wherein the determining, based on the second service scenario, a parameter of a second shared memory pool comprises:

obtaining memory usage information in a first time period in the second service scenario; and determining the parameter of the second shared memory pool based on the memory usage information, and wherein the determining the parameter of the second shared memory pool based on the memory usage information comprises:

obtaining a memory usage value in a second time period in the second service scenario;

when the memory usage value is greater than a maximum size of a first shared memory pool, using the memory u value as the maxi mum size of the second shared memory pool, or when the memory value is less than a maximum size of a first shared memory pool using the memory usage value a s the maximum size of the second shared memory pool; and when the memory usage value is greater than a minimum size of the first shared memory pool, using the memory usage value as the minimum size of the second shared memory pool, or when the memory usage value is less than a minimum size of the first shared memory pool, using the memory usage value as the minimum size of the second shared memory pool.

2. The method according to claim 1, wherein the first shared memory pool mechanism is a shared memory pool mechanism suitable for a first service scenario, and before the determining a second shared memory pool mechanism suitable for a second service scenario based on the second service scenario, the method further comprises:

determining that a service scenario has been switched from the first service scenario to the second service scenario.

3. The method according to claim 1, wherein the first shared memory pool mechanism is an initialized shared memory pool mechanism.

4. The method according to claim 1, wherein the parameter of the second shared memory pool comprises a maximum size and a minimum size of the second shared memory pool.

5. The method according to claim 4, wherein the determining the second shared memory pool mechanism applicable to the second service scenario based on the parameter of the second shared memory pool comprises:

when a difference between the maximum size of the second shared memory pool and the minimum size of the second shared memory pool is less than a third threshold, determining that the second shared memory pool mechanism is a fixed memory pool mechanism; or when a difference between the maximum size of the second shared memory pool and the minimum size of the second shared memory pool is greater than a fourth threshold, determining that the second shared memory pool mechanism is a dynamic memory pool mechanism.

6. An apparatus for dynamically managing a shared memory pool, comprising a memory and at least one processor, wherein the memory is configured to store a computer program including instructions that, when executed by the at least one processor, cause the apparatus to perform operations for dynamically managing a shared memory pool, the operations comprising:

determining a first shared memory pool mechanism for the shared memory pool, wherein the first shared memory pool mechanism is a fixed memory pool mechanism or a dynamic memory pool mechanism;

determining a second shared memory pool mechanism suitable for a second service scenario based on the second service scenario, wherein the second shared memory pool mechanism is a fixed memory pool mechanism or a dynamic memory pool mechanism; and when the second shared memory pool mechanism is different from the first shared memory pool mechanism, adjusting the first shared memory pool mechanism to the second shared memory pool mechanism, wherein the determining a second shared memory pool mechanism suitable for a second service scenario based on the second service scenario comprises:

determining, based on the second service scenario, a parameter of a second shared memory pool, the parameter being applicable to the second service scenario; and determining the second shared memory pool mechanism applicable to the second service scenario based on the parameter of the second shared memory pool, where the determining, based on the second service scenario, a parameter of a second shared memory pool comprises;

obtaining memory usage information in a first time period in the second service scenario; and determining the parameter of the second shared memory pool based on the memory usage information, wherein the determining the parameter of the second shared memory pool based on the memory usage information comprises:

obtaining a memory usage value in a second time period in the second service scenario;

when the memory usage value is greater than a maximum size of a first shared memory pool, using the memory usage value as the maximum size of the second shared memory pool, or when the memory usage value is less than a maximum size of a first shared memory pool using the memory usage value as the maximum size of the second shared memory pool, and when the memory usage value is greater than a minimum size of the first shared memory pool, using the memory us age value as the minimum size of the second shared memory pool, or when the men usage value is less than a minimum size of the first shared memory pool using the memory usage value as the minimum size of the second shared memory pool.

7. The apparatus according to claim 6, wherein
the first shared memory pool mechanism is a shared memory pool mechanism suitable for a first service scenario, and
before determining the second shared memory pool mechanism suitable for the second service scenario based on the second service scenario, the operations further comprise:
determining that a service scenario has been switched from the first service scenario to the second service scenario.

8. The apparatus according to claim 6, wherein the first shared memory pool mechanism is an initialized shared memory pool mechanism.

9. The apparatus according to claim 6, wherein the parameter of the second shared memory pool comprises a maximum size and a minimum size of the second shared memory pool.

10. The apparatus according to claim 9, wherein the determining the second shared memory pool mechanism applicable to the second service scenario based on the parameter of the second shared memory pool comprises:
when a difference between the maximum size of the second shared memory pool and the minimum size of the second shared memory pool is less than a third threshold, determining that the second shared memory pool mechanism is a fixed memory pool mechanism; or
when a difference between the maximum size of the second shared memory pool and the minimum size of the second shared memory pool is greater than a fourth threshold, determining that the second shared memory pool mechanism is a dynamic memory pool mechanism.

11. A non-transitory computer program storage medium, storing program instructions that, when executed by at least one processor, enable the at least one processor to perform operations comprising:
determining a first shared memory pool mechanism for a shared memory pool, wherein the first shared memory pool mechanism is a fixed memory pool mechanism or a dynamic memory pool mechanism;
determining a second shared memory pool mechanism suitable for a second service scenario based on the second service scenario, wherein the second shared memory pool mechanism is a fixed memory pool mechanism or a dynamic memory pool mechanism; and
when the second shared memory pool mechanism is different from the first shared memory pool mechanism, adjusting the first shared memory pool mechanism to the second shared memory pool mechanism,
wherein the determining a second shared memory pool mechanism suitable for a second service scenario based on the second service scenario comprises:
determining, based on the second service scenario, a parameter of a second shared memory pool, the parameter being applicable to the second service scenario, and
determining the second shared memory pool mechanism applicable to the second service scenario based on the parameter of the second shared memory pool,
wherein the determining, based on the second service scenario, a parameter of a second shared memory pool comprises:
obtaining memory usage information in a first time period in the second service scenario; and
determining the parameter of the second shared memory pool based on the memory usage information,
wherein the determining the parameter of the second shared memory pool based on the memory usage information comprises;
obtaining a memory usage value in a second time period in the second service scenario;
when the memory usage value is greater than a maximum size of a first shared memory pool, using the memory usage value as the maximum size of the second shared memory pool, or
when the memory value is less than a maximum size of first shared memory pool, using the memory usage value as the maximum size of the second shared memory pool; and
when the memory usage value is greater than a minimum size of the first shared memory pool, using the memory usage value as the minimum size of the second shared memory pool, or
when the memory usage value is less than a minimum size of the first shared memory pool, using the memory usage value as the minimum size of the second shared memory pool.

12. A chip, wherein the chip comprises at least one processor, and when program instructions are executed by the at least one processor, the at least one processor is enabled to perform operations comprising:
determining a first shared memory pool mechanism for a shared memory pool, wherein the first shared memory pool mechanism is a fixed memory pool mechanism or a dynamic memory pool mechanism;
determining a second shared memory pool mechanism suitable for a second service scenario based on the second service scenario, wherein the second shared memory pool mechanism is a fixed memory pool mechanism or a dynamic memory pool mechanism; and
when the second shared memory pool mechanism is different from the first shared memory pool mechanism, adjusting the first shared memory pool mechanism to the second shared memory pool mechanism,
wherein the determining a second shared memory pool mechanism suitable for a second service scenario based on the second service scenario comprises:
determining, based on the second service scenario, a parameter of a second shared memory pool, the parameter being applicable to second scenario; and
determining the second shared memory pool mechanism applicable to the second service scenario based on the parameter of the second shared memory pool,
wherein the determining, based on the second service scenario, a parameter of a second shared memory pool comprises:
obtaining memory usage information in a first time period in the second service scenario; and
determining the parameter of the second shared memory pool based on the memory usage information,
wherein the determining the parameter of the second shared memory pool based on the memory usage information comprises:
obtaining a memory usage value in a second time period in the second service scenario;

when the memory usage value is greater than a maximum size of a first shared memory pool, using the memory usage value as the maximum size of the second shared memory pool, or when the memory usage value is less than a maximum size of a first shared memory pool, using the memory usage value as the maximum size of the second shared memory pool; and when the memory usage value is greater than a minimum size of the first shared memory pool using the memory usage value as the minimum size of the second shared memory pool, or when the memory usage value is less than a minimum size of the first shared memory pool, using the memory usage value as the minimum size of the second shared memory pool.

\* \* \* \* \*

UNITED STATES PATENT AND TRADEMARK OFFICE
CERTIFICATE OF CORRECTION

| | |
|---|---|
| PATENT NO. | : 12,175,082 B2 |
| APPLICATION NO. | : 17/990990 |
| DATED | : December 24, 2024 |
| INVENTOR(S) | : Guofeng Zhu et al. |

Page 1 of 1

It is certified that error appears in the above-identified patent and that said Letters Patent is hereby corrected as shown below:

In the Claims

Column 17, Claim 1, Line 11, change "meter" to --a parameter--;

Column 17, Claim 1, Line 31, change "u value as the maxi mum" to --usage value as the maximum--;

Column 17, Claim 1, Line 33, change "memory value" to --memory usage value--;

Column 17, Claim 1, Line 35, change "a s" to --as--;

Column 18, Claim 6, Line 32, change "where" to --wherein--;

Column 18, Claim 6, Line 54, change "us age" to --usage--;

Column 19, Claim 6, Line 1, change "men" to --memory--;

Column 20, Claim 11, Line 17, change "memory value" to --memory usage value--; and Column 20, Claim 12, Line 24, change "applicable to second scenario;" to --applicable to the second service scenario;--.

Signed and Sealed this
Eleventh Day of March, 2025

Coke Morgan Stewart
*Acting Director of the United States Patent and Trademark Office*